No. 651,722. Patented June 12, 1900.
G. W. MURPHY.
FUEL PRESS.
(Application filed Aug. 15, 1899.)
(No Model.)
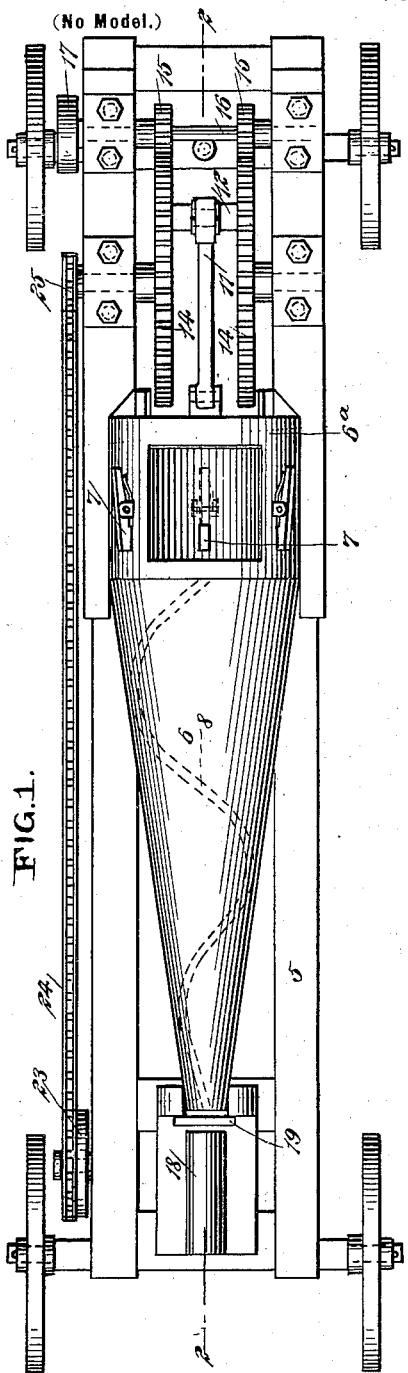
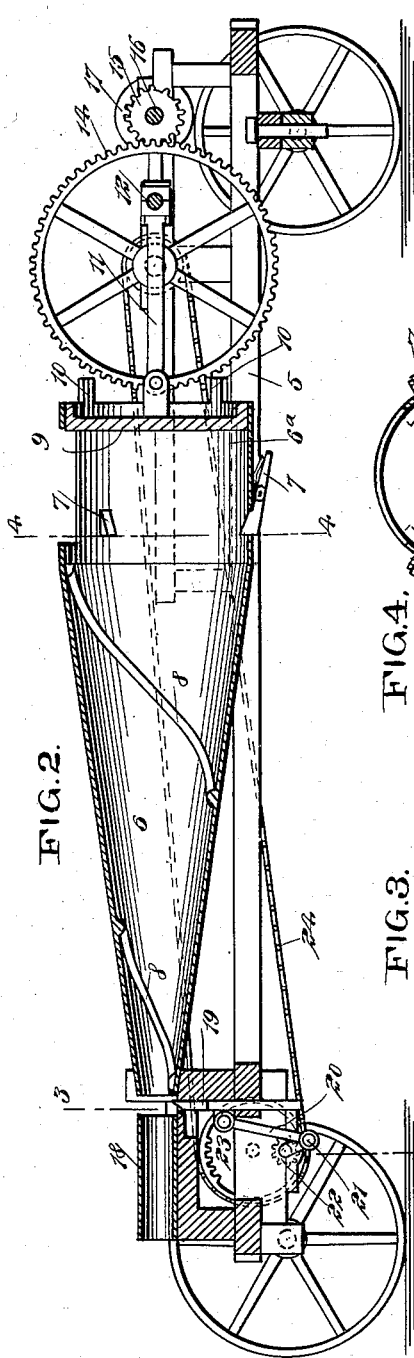
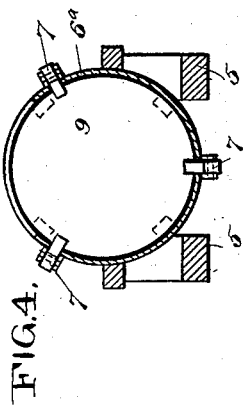
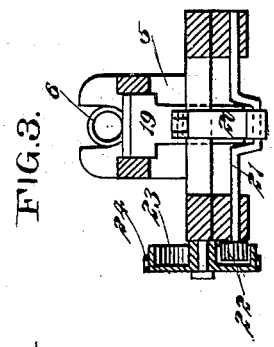
WITNESSES:
INVENTOR
BY
ATTORNEYS

UNITED STATES PATENT OFFICE.

GEORGE W. MURPHY, OF NORTHFIELD, MINNESOTA.

FUEL-PRESS.

SPECIFICATION forming part of Letters Patent No. 651,722, dated June 12, 1900.

Application filed August 15, 1899. Serial No. 727,313. (No model.)

*To all whom it may concern:*

Be it known that I, GEORGE W. MURPHY, of Northfield, in the county of Rice and State of Minnesota, have invented a new and Improved Fuel-Press, of which the following is a full, clear, and exact description.

The purpose of this invention is to provide means for pressing straw and the like into compact form for use as fuel; and the apparatus involves a novel means by which the straw is pressed and cut into blocks suitable for the purpose mentioned.

This specification is the disclosure of one form of my invention, while the claims define the actual scope thereof.

Reference is to be had to the accompanying drawings, forming a part of this specification, in which similar characters of reference indicate corresponding parts in all the views.

Figure 1 is a plan view of the invention. Fig. 2 is a section on the line 2 2 of Fig. 1. Fig. 3 is a section on the line 3 3 of Fig. 2. Fig. 4 is a section on the line 4 4 of Fig. 2.

The apparatus is mounted on a wheeled frame 5 and comprises a compressing-chamber 6 of conical form, the base of which is provided with a cylindrical extension $6^a$, forming a receiving-chamber, the top of which has an opening therein for the reception of the straw. Spring-pressed dogs 7 are mounted on the cylindrical receiving-section $6^a$, the dogs serving to prevent the return of the straw when pushed from the receiving-chamber into the compressing-chamber. The compressing-chamber is formed with an internal spiral thread 8, which serves to give the material a twist during its progress to the small or discharge end of the compression-chamber, thus increasing the compression effected. A plunger-head 9 works in the receiving-chamber $6^a$ and is formed with a peripheral flange having guide-lugs 10, extended rearwardly therefrom, the flange and guide-lugs serving to cause the plunger-head to move true in the receiving-chamber. This plunger-head is driven by a pitman 11, which is connected to a wrist-pin 12, the wrist-pin being fastened between two spur-wheels 14, mounted in the frame and driven by pinions 15, which mesh therewith and which are carried on a primary-movement shaft 16, furnished with a band-pulley 17 to carry the driving-belt. As the plunger-head is withdrawn to the position shown in Fig. 2 the straw is inserted into the receiving-chamber, and then as the plunger moves forward it forces the straw into the compression-chamber. This is continued throughout the operation of the machine.

The small or discharge end of the conical compression-chamber 6 is juxtaposed to a delivery-tube 18, the contiguous ends of the delivery-tube and the compression-chamber being spaced apart to permit the movement between them of a vertically-operating knife 19. This knife 19 is mounted in the framing to reciprocate past the mouth of the compression-chamber, thus cutting the compressed straw into uniform lengths. The knife 19 is driven by a link 20, connected therewith and with a crank-shaft 21. This crank-shaft is mounted in the frame and carries a pinion 22. The pinion 22 meshes with a mutilated internal gear 23, also mounted to turn in the frame, the arrangement being such that for each revolution of the wheel 22 the shaft 21 is also given one revolution. The mutilated gear 23 has its periphery engaged by a chain 24, which passes rearwardly to and around a sprocket-wheel 25, which is fastened to the axle of one of the spur-wheels 14. It will thus be seen that the knife 19 is actuated in time with the movements of the plunger. The straw is compressed in and forced through the compression-chamber and projected into the delivery-tube 18 and is simultaneously cut by the knife 19.

The operation of the plunger in compressing the straw is assisted by the spiral thread 8 within the compression-chamber, and the result is that the fuel is so tightly compressed that it will not be necessary to employ a band for holding it. A slight expansion may occur after the passage of the straw from the machine; but this will not be sufficient to destroy the usefulness of the material as a fuel.

Having thus described my invention, I claim as new and desire to secure by Letters Patent—

1. A fuel-press, having a conical compression-chamber, a receiving-chamber communicating with the large end of the compression-chamber, a plunger working in the receiving-chamber, means for driving the plunger, a delivery-tube juxtaposed to the small or discharge end of the compression-chamber, a knife mounted to move between the mouth of the compression-chamber and the delivery-tube, a crank-shaft having connection with the knife, an internal mutilated gear, a gear on the crank-shaft working with the internal mutilated gear, and means for driving the internal mutilated gear, such means being in connection with the means for driving the plunger.

2. A fuel-press, comprising a conical compression-chamber having a spiral thread formed therein, a receiving-chamber communicating with the rear end of the compression-chamber, a plunger working in the receiving-chamber to force the material into and through the compression-chamber, the thread of the compression-chamber serving to turn the material to be compressed, causing it to be rolled into compact form, a knife mounted at the discharge end of the compression-chamber, and means for driving the plunger and knife, the knife serving periodically to sever into lengths the material compressed.

3. In a fuel-press, the combination of a conical compression-chamber having a spiral thread formed therein, and a plunger mounted to reciprocate at the large or receiving end of the compression-chamber and serving to force the material to be compressed longitudinally into and through the compression-chamber, the thread of the compression-chamber serving to turn the material to be compressed, causing it to be rolled into compact form.

GEORGE W. MURPHY.

Witnesses:
I. H. PRESHO,
F. O. RICE.